(12) United States Patent
Okada

(10) Patent No.: US 7,716,959 B2
(45) Date of Patent: May 18, 2010

(54) STEERING LOCK DEVICE

(75) Inventor: Takahiro Okada, Yokohama (JP)

(73) Assignee: Alpha Corporation, Yokohama-shi (JP)

( * ) Notice: Subject to any disclaimer, the term of this patent is extended or adjusted under 35 U.S.C. 154(b) by 0 days.

(21) Appl. No.: 12/292,236

(22) Filed: Nov. 14, 2008

(65) Prior Publication Data
US 2009/0126426 A1 May 21, 2009

(30) Foreign Application Priority Data
Nov. 16, 2007 (JP) .............................. 2007-298452

(51) Int. Cl.
B60R 25/02 (2006.01)
(52) U.S. Cl. .......................................... 70/186; 74/492
(58) Field of Classification Search ........... 70/182–186, 70/252; 74/492; 280/775, 777, 779
See application file for complete search history.

(56) References Cited

U.S. PATENT DOCUMENTS

| | | | | |
|---|---|---|---|---|
| 1,180,802 A | * | 4/1916 | Terry | 70/185 |
| 1,332,075 A | * | 2/1920 | Smith | 70/185 |
| 1,345,828 A | * | 7/1920 | Boswell | 70/185 |
| 1,353,408 A | * | 9/1920 | McCormick | 70/185 |
| 1,359,213 A | * | 11/1920 | Welch | 70/183 |
| 1,360,674 A | * | 11/1920 | Olbon | 70/185 |
| 1,360,692 A | * | 11/1920 | Scott | 70/183 |
| 1,374,769 A | * | 4/1921 | Schicke | 70/299 |
| 1,414,991 A | * | 5/1922 | McKeage | 70/211 |
| 1,417,603 A | * | 5/1922 | Hershey | 70/185 |
| 1,428,089 A | * | 9/1922 | Hall | 70/183 |
| 1,436,585 A | * | 11/1922 | Cornell | 70/183 |
| 3,389,442 A | * | 6/1968 | Tetzlaff | 24/278 |
| D268,735 S | * | 4/1983 | Kanao | D8/396 |
| D270,997 S | * | 10/1983 | Kanao | D8/396 |
| 4,425,770 A | | 1/1984 | Mentani et al. | |
| 4,882,814 A | * | 11/1989 | Takahashi | 24/20 R |
| 4,892,276 A | * | 1/1990 | Alessio | 248/74.1 |
| 5,010,626 A | * | 4/1991 | Dominguez | 24/279 |
| 5,299,344 A | * | 4/1994 | Oetiker | 24/284 |
| 5,323,515 A | * | 6/1994 | Baekdahl | 24/279 |
| 6,398,170 B1 | * | 6/2002 | Wada | 248/74.5 |
| 6,594,869 B1 | * | 7/2003 | Chen | 24/274 R |
| 7,316,138 B2 | * | 1/2008 | Goshima et al. | 70/186 |
| 2002/0038495 A1 | * | 4/2002 | Anthes et al. | 24/279 |
| 2006/0081023 A1 | | 4/2006 | Tanimoto | |
| 2007/0068207 A1 | | 3/2007 | Goshima et al. | |

FOREIGN PATENT DOCUMENTS

JP 2007-055546 3/2007

* cited by examiner

*Primary Examiner*—Lloyd A Gall
(74) *Attorney, Agent, or Firm*—The Nath Law Group; Jerald L. Meyer; Derek Richmond

(57) ABSTRACT

A steering lock device includes a supporting bracket which is attached to a steering lock body including a lock member restricting rotation of a steering shaft within a steering column and is fastened to the steering lock body to fix the steering lock body to the steering column. The supporting bracket includes a shaft supporting portion pivotally supported by a supporting shaft; a shaft support cancellation preventing portion preventing to cancel the pivotable support of the shaft supporting portion by the supporting shaft; and an engagement holding portion holding the shaft support cancellation preventing portion. The steering body is provided with bearing portions through which the supporting shaft is inserted.

2 Claims, 6 Drawing Sheets

STEERING LOCK DEVICE

BACKGROUND OF THE INVENTION

1. Field of the Invention

The present invention relates to a steering lock device locking rotation of a steering shaft of a vehicle.

2. Description of the Related Art

This type of a conventional steering lock mechanism is disclosed in Japanese Patent Laid-open Publication No. 2007-55546. As shown in FIGS. 1 and 2, the conventional steering lock mechanism 100 includes a key lock collar 103, a lock member 104, a steering lock body 105, and a supporting bracket 106. The key lock collar 103 is attached and fixed to a steering shaft 102 provided within a steering column. The lock member 104 is a rotation limiting member which is movable in a radial direction of the steering shaft 102 and fittable to the key lock collar 103. The steering lock body 105 abuts on an outer circumferential surface of the steering column 101. The supporting bracket 106 is attached to the steering lock body 105 and supports the steering column 101. One end of the supporting bracket 106 is fastened to the steering lock body 105 by a bolt 107 and the other end of the supporting bracket 106 is attached to the steering lock body 105 through an attachment section 108. The attachment section 108 includes: a pair of bearing portions 110 formed in the steering lock body 105; a supporting shaft 109 inserted through the pair of the bearing portions 110; a shaft supporting portion 111 formed by bending the other end of the supporting bracket 106 and axially supported by the supporting shaft 109; a shaft support cancellation preventing portion 112 extending from the shaft supporting portion 111 towards the inner circumferential surface of the supporting bracket 106. The supporting shaft 109, the pair of the bearing portions 110, and the shaft supporting portion 111 constitute a hinge structure. Furthermore, a distance between the pair of the bearing portions 110 in an axial direction is set a little larger than a width of the shaft supporting portion 111. A width of the shaft support cancellation preventing portion 112 is set larger than the distance of the pair of the bearing portions 110.

In the conventional steering lock mechanism 100, the steering shaft 102 is coupled to a not-shown steering wheel. The steering shaft 102 is rotatably supported by the steering column 101. When a driver of a vehicle turns the steering wheel, turning force is transmitted through the steering shaft 102 to a not-shown steering device. Moreover, when a not-shown ignition key is taken out, the lock member 104 moves towards the steering shaft 102 and is fitted to the key lock collar 103. This restricts the rotation of the steering shaft 102, thus rendering the vehicle unsteerable. If the steering wheel is forced to rotate in a state where the steering shaft 102 is in a locked status described as above, the steering shaft 102 is subjected to large rotary torque. The supporting bracket 106 is accordingly energized outward. The shaft supporting portion 111 is therefore pulled and is exposed to stress so as to cancel the shaft support. At this time, an end of the shaft support cancellation preventing portion 112 in the width direction comes into contact with upper surfaces of the bearing portions 110 to prevent significant deformation of the shaft supporting portion 111. Accordingly, the supporting bracket 106 is kept attached, and the steering shaft 102 is kept the locked status. It is therefore possible to prevent a parked vehicle from being stolen.

SUMMARY OF THE INVENTION

However, in the aforementioned conventional art, when large rotary torque is applied to the steering shaft 102 while the steering shaft 102 is in the locked status, the attachment portion 108 of the supporting bracket 106 is subjected to considerably large stress. At this time, the shaft supporting portion 111, which is formed by bending the other end of the supporting bracket 106, is strongly pulled. The attachment portion 108 could be then deformed, and the attachment of the supporting bracket 106 becomes improper. Moreover, it could be difficult to keep the locked status of the steering shaft 102. Furthermore, the shaft supporting portion 111 could be cut in a comparatively short time by inserting a tool such as a slotted screwdriver into a small gap between the end of the support cancellation preventing portion 112 in the width direction and the upper surfaces of the bearing portions 110 and applying tensile stress to the end of the shaft supporting portion 111 in the width direction by the principle of leverage.

Accordingly, an object of the present invention is to provide a steering lock device which is capable of preventing a parked vehicle from being stolen and reducing damage of a bracket supporting a steering column caused while a steering shaft is in a locked status.

A steering lock device according to a first aspect of the present invention comprises: a steering lock body including bearing portions abutted on an outer circumferential surface of a steering column; a lock member movably provided for the steering lock body restricting rotation of the steering shaft; a supporting shaft supported by the bearing portions of the steering lock body; and a supporting bracket composed of a belt member. The supporting bracket includes: a shaft supporting portion provided at one end side of the supporting bracket wound around and rotatably supported the outer circumferential surface of the supporting shaft, a fastening portion provided at the other end side of the supporting bracket fastened to the steering lock body by a fastening member, a shaft support cancellation preventing portion having an engagement portion, and an engagement holding portion engaged with the engagement portion and holding the engagement with the engagement portion.

In the above configuration, the engagement holding portion holds the shaft support cancellation preventing portion when the steering shaft is subjected to large rotary torque to energize the supporting bracket outward and apply large stress to the shaft support portion while the steering shaft is in a locked status. This prevents the shaft support cancellation preventing portion and the shaft supporting portion adjacent thereto from being deformed. Moreover, an end of the shaft support cancellation preventing portion in the width direction is abutted on the surface of the steering lock body. This prevents deformation of the shaft supporting portion, thus preventing cancellation of the shaft support. It is therefore possible to keep proper attachment of the supporting bracket. Accordingly, the steering shaft is kept in the locked status, thus enhancing the anti-theft performance of a parked car (the capability of preventing a parked car from being stolen).

Preferably, the supporting bracket includes a belt-shaped body part provided in close contact with the steering lock body and the steering column with no space therebetween. Preferably, the shaft supporting portion is positioned on the one end side of the body part and wound around the outer circumference of the supporting shaft outward with respect to the steering column with no space therebetween to be supported by the supporting shaft. Preferably, the shaft support cancellation preventing portion includes an engagement portion which is provided at a one end-side end portion located on the one end side of the shaft supporting portion and protrudes from both edges of the one end-side end portion in the width direction. Preferably, the engagement holding portion includes a pair of holder pieces protruding in the width direction from both edges of the body part in the vicinity of the shaft supporting portion. In this case, the pair of holder pieces are folded outward with respect to the steering column to sandwich the held portion located between the shaft supporting portion and the shaft support cancellation preventing portion and are engaged with the engagement portion.

In the above configuration, the held portion is laid on the outer surface of the body portion of the supporting bracket. Accordingly, to cut the shaft support cancellation preventing portion or the shaft supporting portion, which are comparatively easy targets to break, both the body portion and the held portion need to be cut. It is therefore possible to prevent the shaft support cancellation preventing portion or the shaft supporting portion from being cut. Moreover, the held portion of the supporting bracket is sandwiched between the body portion and the engagement holding portion. This can increase the rigidities of the shaft support cancellation preventing portion and the shaft supporting portion. It is therefore possible to more reliably prevent the shaft support cancellation preventing portion and the shaft supporting portion from being deformed or cut.

Moreover, it is preferable that space is provided between ends of the pair of the holder pieces opposite to each other in a state where the pair of the holder pieces holds the held portion inside.

The space of the engagement holding portion in the width direction is made wider. This makes it impossible to insert a tool such as a slotted screwdriver into the space and apply force enough to detach the engagement holding portion by the principle of cantilever. Also in this term, the supporting bracket is protected from breakage.

BRIEF DESCRIPTION OF THE DRAWINGS

FIG. 9A being a plan view of a plate member as a material of the supporting bracket; FIG. 9B being a plan view showing the plate member folded at an end with a held portion laid on a body portion; and FIG. 9C being a plan view showing the shaped supporting bracket.

DETAILED DESCRIPTION OF THE PREFERRED EMBODIMENT

Figure 1:
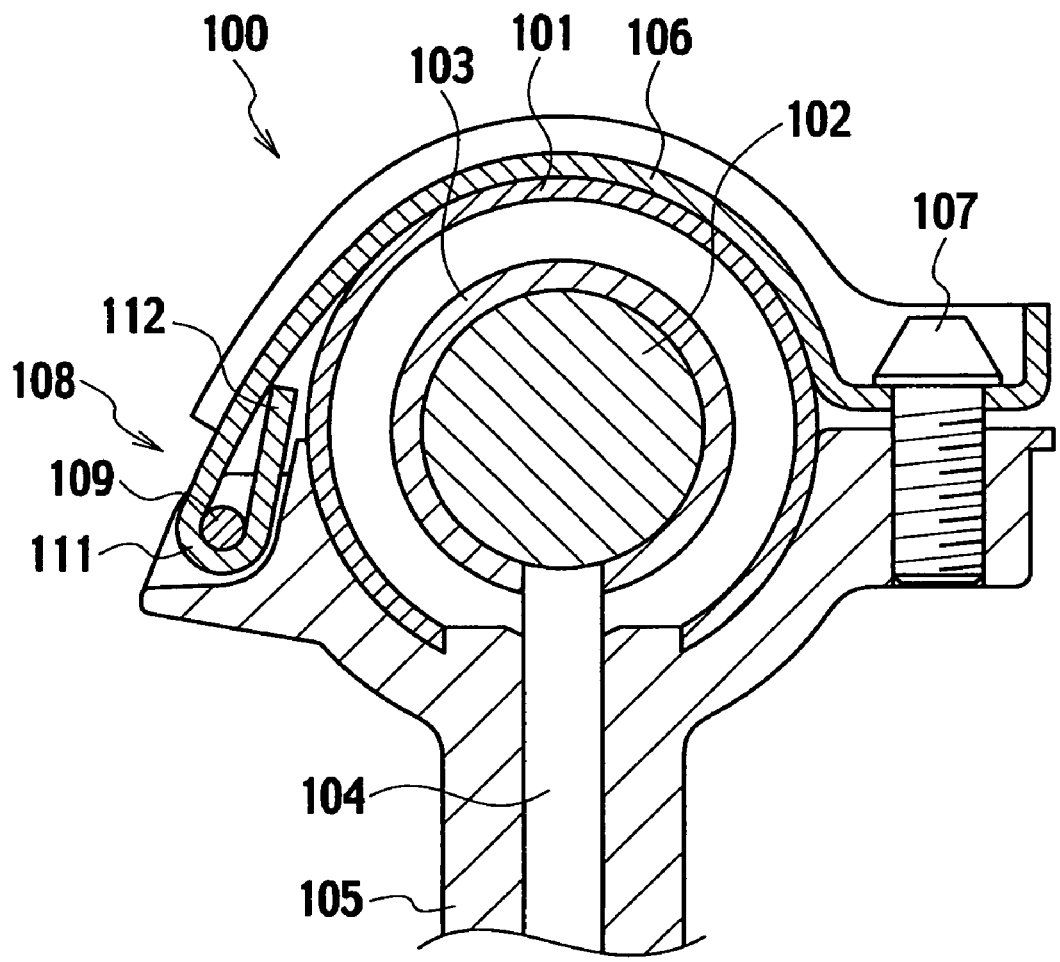
FIG. 1 is a cross-sectional view of a steering lock device of a conventional example.
Figure 2:
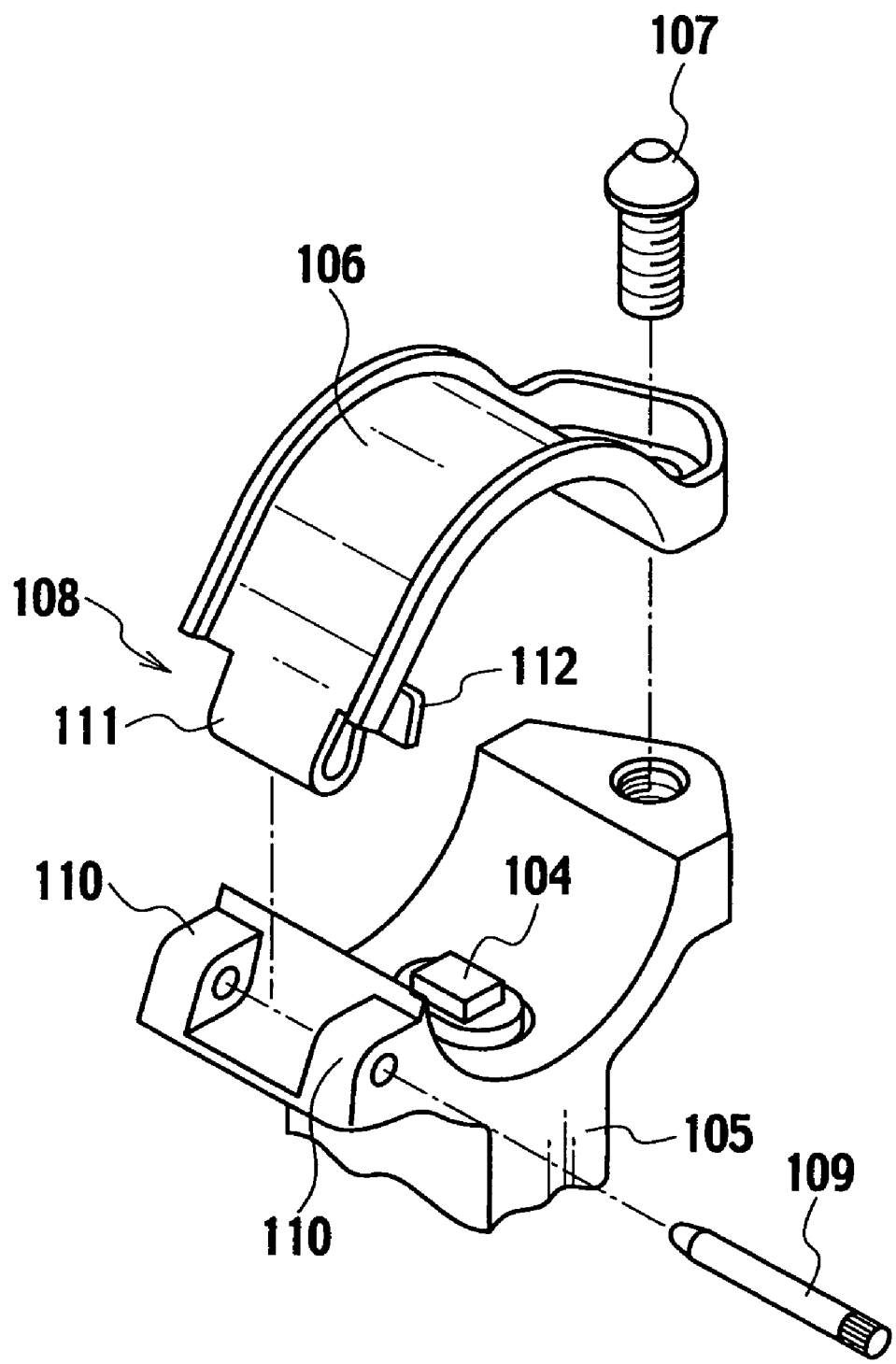
FIG. 2 is a perspective view of the steering lock device of the conventional example.
Figure 3:
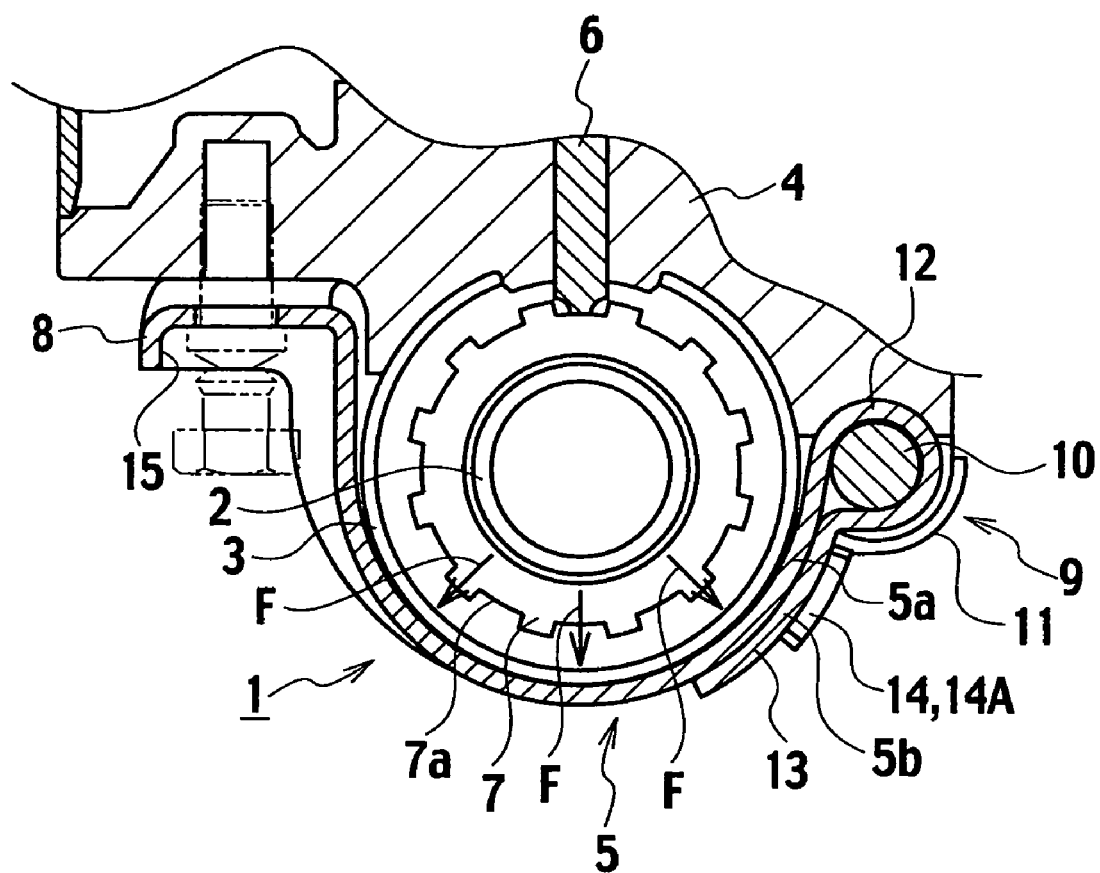
FIG. 3 shows an embodiment of the present invention and is a cross-sectional view of a steering lock device.
Figure 4:
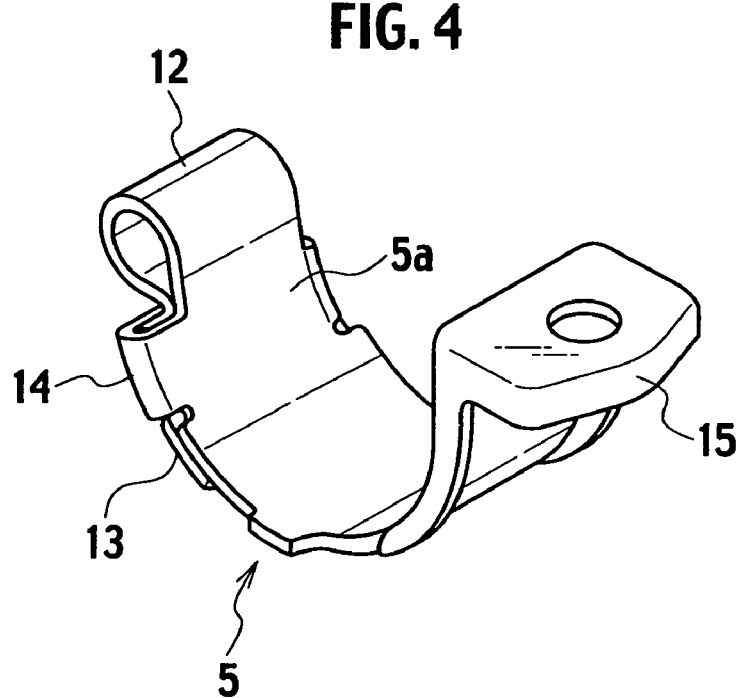
FIG. 4 shows the embodiment of the present invention and is a perspective view of a supporting bracket from an inner side.
Figure 5:
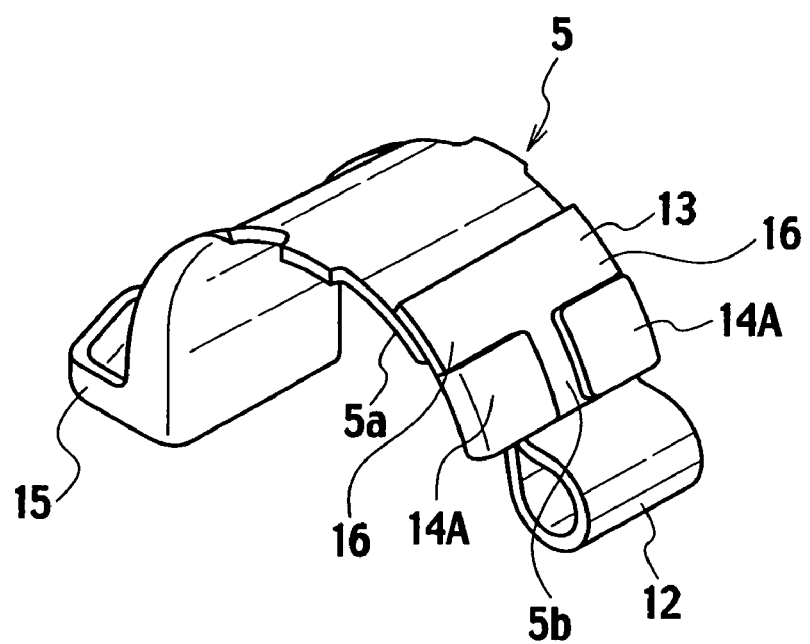
FIG. 5 shows the embodiment of the present invention and is a perspective view of the supporting bracket from an outer side.
Figure 6:
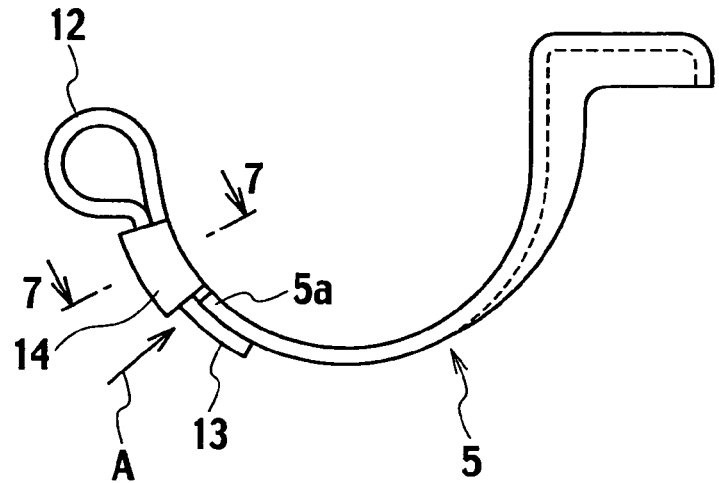
FIG. 6 shows the embodiment of the present invention and is a front view of the supporting bracket.
Figure 7:
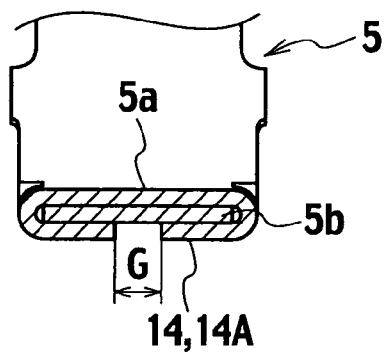
FIG. 7 shows the embodiment of the present invention and is a cross-sectional view take along a line 7-7 of FIG. 6.
Figure 8:
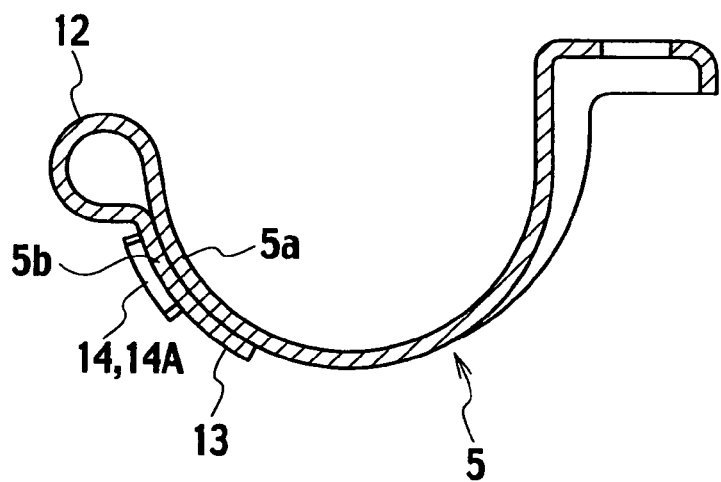
FIG. 8 shows the embodiment of the present invention and is a cross-sectional view of the supporting bracket taken along a central line thereof in a width direction.

A description is given of an embodiment of the present invention based on the drawings below.

As shown in FIGS. 3 to 9, a steering lock device 1 includes a steering lock body 4, a supporting bracket 5, a lock member 6, and a key lock collar 7. The steering lock body 4 abuts on an outer circumferential surface of a steering column 3 accommodating a steering shaft 2. The supporting bracket 5 is attached to the steering lock body 4 and supports the steering column 3. The lock member 6 is movably provided for the steering lock body 4 and serves as a rotation restriction member restricting rotation of the steering shaft 2. The key lock collar 7 is attached and fixed to the steering shaft 2 and is provided with a plurality of grooves 7a which are extended in an axial direction and are each fittable to the lock member 6. The steering shaft 2 is linked to a not-shown steering wheel and is rotatably supported by the steering column 3. When a driver of a vehicle turns the steering wheel, the turning force is transmitted through the steering shaft 2 to a steering device (not shown).

The supporting bracket 5 supports the steering column 3 through an attachment section 9 and a fastening section 15 and is assembled to the steering lock body 4.

The attachment section 9 includes: a pair of bearing portions 11 which are formed in the steering lock body 4 and supports both ends of a supporting shaft 10; a shaft supporting portion 12 formed in the supporting bracket 5 as precisely described later; a shaft support cancellation preventing portion 13; and an engagement holding portion 14. The supporting shaft 10, the bearing portions 11, and the shaft supporting portion 12 constitute a hinge structure. A distance between the pair of the bearing portions 11 in an axial direction is set a little larger than width of the shaft supporting portion 12. Width of the shaft support cancellation preventing portion 13 is set a little larger than the distance between the pair of bearing portions 11.

Figure 9C:
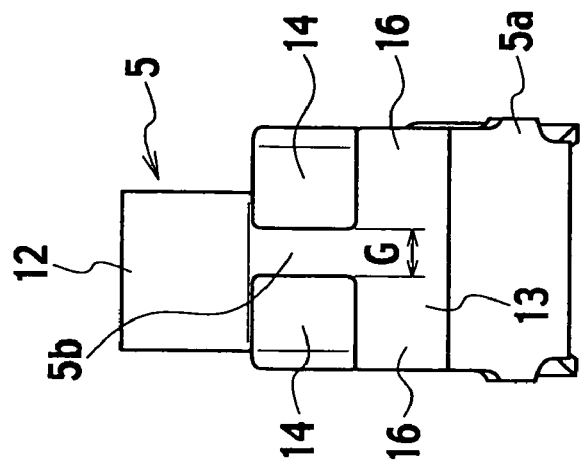
FIGS. 9A to 9C show the embodiment of the present invention and are plan views showing a process of forming the supporting bracket.
Figure 9B:
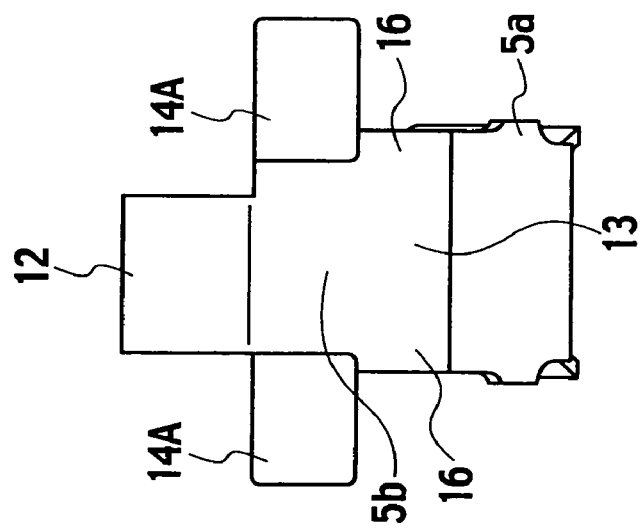
Figure 9A:
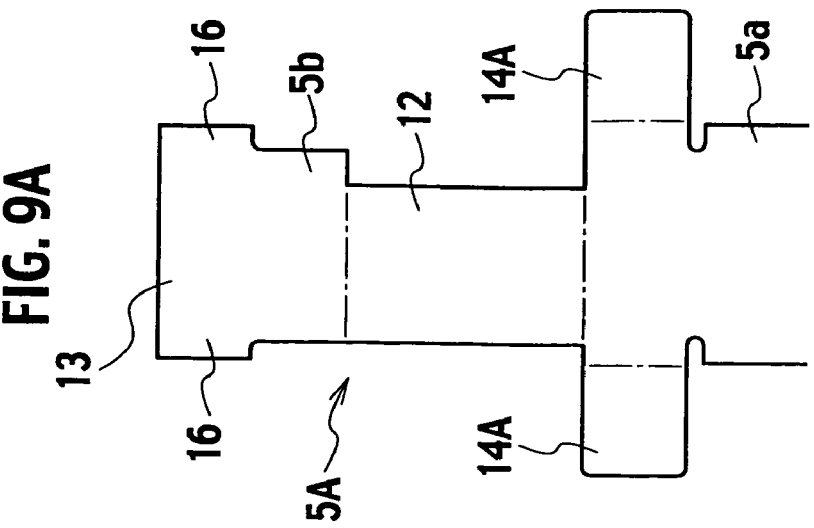

The supporting bracket 5 is formed by folding a plate member 5A shown in FIG. 9A. The supporting bracket 5 includes the fastening section 15, a body portion 5a, the shaft supporting portion 12, a held portion 5b, and the shaft support cancellation preventing portion 13 starting from the other end towards the one end. The fastening section 15 is provided with a through-hole and is fastened to the steering lock body 4 with a bolt 8.

The body portion 5a of the supporting bracket 5 is shaped in a belt and is provided in close contact with the steering lock body 4 and the outer circumferential surface of the steering column 3 without gap. The shaft supporting portion 12 provided for the supporting bracket 5 is positioned on the one end side of the body portion 5a and is wound around the outer circumference of the supporting shaft 10 outward with respect to the steering column 3 without gap to be pivotally supported by the supporting shaft 10. The shaft support cancellation preventing portion 13 is formed in an end part at the one end side of the shaft supporting portion 12 and is provided with an engagement portion 16 protruding in the width direction from both ends of the end part on the one end side. The engagement holding portion 14 provides with a pair of holder pieces 14A protruding in the width direction from both edges of the body portion 5a in the vicinity of the shaft supporting portion 12. The engagement holding portion 14 has a structure in which the pair of the holder pieces 14A are folded outward with respect to the steering column 3 so that the engagement holding portion 14 sandwiches the held portion 5b located between the shaft supporting portion 12 and the shaft support cancellation preventing portion 13 and edges thereof are engaged with the engagement portion 16.

At shaping the supporting bracket 5, as shown in FIG. 9B, at first the held portion 5b is folded with respect to the body portion 5a of the supporting bracket 5 and is laid on the outer surface of the body portion 5a. A folded section curved between the body portion 5a and the held portion 5b thus constitutes the shaft supporting portion 12. The held portion 5b constitutes the shaft support cancellation preventing portion 13. Subsequently, as shown in FIG. 9C, the pair of the holder pieces 14A protruded from the body portion 5a in the width direction are folded onto the outer surface of the shaft support cancellation preventing portion 13. The engagement holding portion 14 is thus formed. A gap G between the ends of the pair of the engagement holding portions 14 in the width direction is set to a predetermined size, for example, a size which is larger than a width of a tip of a tool (not shown) such as a slotted screwdriver.

Next, an operation of the above steering lock device 1 is described. When a not-shown ignition key is taken off, the lock member 6 moves towards the steering shaft 2 and is fitted into the key lock collar 7. This restricts rotation of the steering shaft 2 and renders the vehicle unsteerable. Moreover, when the steering wheel is forced to turn in a state where the rotation of the steering shaft 2 is restricted by the lock member 6, the steering shaft 2 is subjected to large rotary torque. The supporting bracket 5 is therefore energized by force F directing outwards, thus the shaft supporting portion 12 is pulled and subjected to stress so as to cancel the shaft supporting status.

However, according to this embodiment, when the supporting bracket 5 is energized by the force F as described above to pull the shaft supporting portion 12, the shaft support cancellation preventing portion 13 is held by the engagement holding portion 14. This prevents to deform the shaft support cancellation preventing portion 13 and the shaft supporting portion 12 adjacent thereto. Moreover, an end of the shaft support cancellation preventing portion 13 in the width direction abuts on the surface of the steering lock body 4. This can also prevent to deform the shaft supporting portion 12 and prevent to cancel the shaft supporting status.

In addition, according to this embodiment, the shaft support cancellation preventing portion 13 composed of the held portion 5b is laid on the outer surface of the body portion 5a of the supporting bracket 5. Accordingly, in order to cut the shaft support cancellation preventing portion 13 or the shaft support portion 12 of the supporting bracket 5, both of the body portion 5a and the held portion 5b need to be cut. Accordingly, the shaft support cancellation preventing portion 13 or the shaft support portion 12 are prevented to be cut. Furthermore, the held portion 5b of the supporting bracket 5 is sandwiched by the engagement holding portion 14 provided with the pair of the holder pieces 14A. Accordingly, the shaft support cancellation preventing portion 13 and the shaft supporting portion 12 are enhanced rigidities of them and are reliably prevented to be deformed and cut.

Moreover, according to this embodiment, the shaft support cancellation preventing portion 13 is held by the engagement holding portion 14 at the both ends in the width direction. Accordingly, the shaft support cancellation preventing portion 13 is prevented to be displaced from a predetermined position on the body portion 5a of the supporting bracket 5. The support cancellation preventing portion 13 can reliably prevent the shaft supporting portion 12 to release the shaft support. Moreover, the gap G between the ends of the engagement holding portion 14 in the width direction is made wider. This prevents that a tool such as a slotted screwdriver is inserted into the gap G to apply force by the principle of cantilever to detach the engagement holding portion 14. In this term, the supporting bracket 5 is protected from breaking actions.

Hereinabove, in the present invention, the steering shaft is in locked status, breakages (deformation and cutoff) of the supporting bracket 5 of the steering column 3 is prevented, and the attachment of the supporting bracket 5 is properly maintained. Accordingly, the locked status of the steering shaft 2 is maintained, thus enhancing anti-theft performance of a parked vehicle.

What is claimed is:

1. A steering lock device comprising:
    a steering lock body including bearing portions abutted on an outer circumferential surface of a steering column;
    a lock member movably provided for the steering lock body restricting rotation of a steering shaft;
    a supporting shaft supported by the bearing portions of the steering lock body; and
    a supporting bracket composed of a belt member including:
        a shaft supporting portion provided at one end side of the supporting bracket wound around and rotatably supported on the outer circumferential surface of the supporting shaft;
        a fastening portion provided at the other end side of the supporting bracket fastened to the steering lock body by a fastening member;
        a shaft support cancellation preventing portion having an engagement portion; and
        an engagement holding portion engaged with the engagement portion and holding the engagement with the engagement portion, wherein
    the supporting bracket includes a belt-shaped body part provided in close contact with the steering lock body and the steering column with no space therebetween,
    the shaft supporting portion is positioned on the one end side of the body part and wound around the outer circumference of the supporting shaft outward with respect to the steering column with no space between the shaft supporting portion and the supporting shaft to be supported by the supporting shaft,
    the engagement portion of the shaft support cancellation preventing portion is provided at an end portion located on the one end side of the shaft supporting portion and protrudes from both edges of the end portion in the width direction,
    the engagement holding portion includes a pair of holder pieces protruding in the width direction from both edges of the body part in the vicinity of the shaft supporting portion, and
    the pair of the holder pieces is folded outwardly with respect to the steering column to sandwich a held portion located between the shaft supporting portion and the shaft support cancellation preventing portion and are engaged with the engagement portion.

2. The steering lock device according to claim 1, wherein a space is provided between ends of the pair of the holder pieces opposite to each other in a state where the pair of the holder pieces holds the held portion inside.

* * * * *